US00RE44264E

(19) United States
(12) Reissued Patent
Lee et al.

(10) Patent Number: US RE44,264 E
(45) Date of Reissued Patent: Jun. 4, 2013

(54) LITHIUM CATIONIC SINGLE-ION CONDUCTING FILLER-CONTAINING COMPOSITE POLYMER ELECTROLYTE FOR LITHIUM SECONDARY BATTERY AND METHOD OF MANUFACTURING THE SAME

(75) Inventors: Young Gi Lee, Daejeon (KR); Kwang Man Kim, Daejon (KR); Kwang Sun Ryu, Daejon (KR); Soon Ho Chang, Daejon (KR)

(73) Assignee: Electronics and Telecommunications Research Institute, Daejeon (KR)

(21) Appl. No.: 12/837,062

(22) Filed: Jul. 15, 2010

Related U.S. Patent Documents

Reissue of:
(64) Patent No.: 7,399,556
Issued: Jul. 15, 2008
Appl. No.: 11/097,730
Filed: Apr. 1, 2005

U.S. Applications:
(63) Continuation-in-part of application No. 10/750,152, filed on Dec. 30, 2003, now Pat. No. 7,211,352.

(30) Foreign Application Priority Data

Apr. 24, 2004 (KR) ..... 10-2004-0028470

(51) Int. Cl.
*H01M 10/40* (2006.01)
*H01M 2/16* (2006.01)

(52) U.S. Cl.
USPC ..... 429/309; 429/307; 429/314; 429/316; 429/317; 429/251; 429/252

(58) Field of Classification Search
None
See application file for complete search history.

(56) References Cited

U.S. PATENT DOCUMENTS 5,219,679 A * 6/1993 Abraham et al. ..... 429/310
5,296,318 A * 3/1994 Gozdz et al. ..... 429/316

(Continued)

FOREIGN PATENT DOCUMENTS

JP 2002-355938 * 12/2002
JP 2003-059480 * 2/2003

(Continued)

OTHER PUBLICATIONS http://www.smallparts.com.*

(Continued)

*Primary Examiner* — Barbara Gilliam
*Assistant Examiner* — Angela Martin
(74) *Attorney, Agent, or Firm* — NSIP Law

(57) ABSTRACT

Provided are a composite polymer electrolyte for a lithium secondary battery in which a composite polymer matrix multi-layer structure composed of a plurality of polymer matrices with different pore sizes is impregnated with an electrolyte solution, and a method of manufacturing the same. Among the polymer matrices, a microporous polymer matrix with a smaller pore size contains a lithium cationic single-ion conducting inorganic filler, thereby enhancing ionic conductivity, the distribution uniformity of the impregnated electrolyte solution, and maintenance characteristics. The microporous polymer matrix containing the lithium cationic single-ion conducting inorganic filler is coated on a surface of a porous polymer matrix to form the composite polymer matrix multi-layer structure, which is then impregnated with the electrolyte solution, to manufacture the composite polymer electrolyte. The composite polymer electrolyte is used in a unit battery. The composite polymer matrix structure can increase mechanical properties. The introduction of the lithium cationic single-ion conducting inorganic filler can provide excellent ionic conductivity and high rate discharge characteristics.

20 Claims, 5 Drawing Sheets

U.S. PATENT DOCUMENTS

| | | | | |
|---|---|---|---|---|
| 5,834,135 | A * | 11/1998 | Pendalwar et al. | 429/303 |
| 6,645,675 | B1 * | 11/2003 | Munshi | 429/305 |
| 2001/0000485 | A1 * | 4/2001 | Ying et al. | 429/228 |

FOREIGN PATENT DOCUMENTS

| | | | |
|---|---|---|---|
| KR | 1020030007659 A | * | 1/2003 |
| KR | 1020040005550 A | * | 1/2004 |
| WO | WO 98/37589 | | 8/1998 |
| WO | WO 98/37589 | * | 9/1998 |
| WO | WO 02/061872 | * | 8/2002 |

OTHER PUBLICATIONS

OEM GE PVPF (Polyvinylidene Fluoride) Transfer Membranes at www.osmolabstore.com.*

Performance of Bellcore's plastic rechargeable Li-ion batteries, J.M. Tarascon, A.S. Gozdz, C. Schmutz, F. Shokoohi, P.C. Warren, Solid State Ionics 86-88 (1996), pp. 49-54.*

Journal of Power Sources 74 (1998) pp. 77-86.*

J. Electrochem. Soc., vol. 142, No. 6, Jun. 1995, pp. 1789-1798.*

* cited by examiner

LITHIUM CATIONIC SINGLE-ION CONDUCTING FILLER-CONTAINING COMPOSITE POLYMER ELECTROLYTE FOR LITHIUM SECONDARY BATTERY AND METHOD OF MANUFACTURING THE SAME

Matter enclosed in heavy brackets [ ] appears in the original patent but forms no part of this reissue specification; matter printed in italics indicates the additions made by reissue.

The present patent application is a *Reissue of U.S. Pat. No. 7,399,566, issued Jul. 15, 2008, which is a* Continuation-in-Part of [application Ser. No. 10/750,152, filed Dec. 30, 2003] *U.S. Pat. No. 7,211,352, issued May 1, 2007.*

BACKGROUND OF THE INVENTION

This application claims priority from Korean Patent Application No. 10-2004-0028470, filed on Apr. 24, 2004, in the Korean Intellectual Property Office, the disclosure of which is incorporated herein in its entirety by reference.

1. Field of the Invention

The present invention relates to a polymer electrolyte for a lithium secondary battery and a method of manufacturing the same. More particularly, the present invention relates to a composite polymer electrolyte for a lithium secondary battery, which includes a composite polymer matrix structure comprised of a plurality of porous polymer matrices of different pore sizes impregnated with an electrolyte solution, and a method of manufacturing the same.

2. Description of the Related Art

Recently, as electric, electronic, communication, and computer industries are rapidly expanding, demands for secondary batteries with high performance and high stability have increased. In particular, as electronic devices progressively become small, thin, and lightweight, in the office automation field, desktop computers are being replaced with smaller and lighter laptop or notebook computers. Also, the use of portable electronic devices such as camcorders and cellular phones has rapidly grown.

As electronic devices become small, thin, and lightweight, secondary batteries that are used as power supply sources for electronic devices are also required to have higher performance. For this, lithium secondary batteries to replace conventional lead storage batteries or lithium-cadmium batteries have been actively researched and developed to satisfy the requirements of small-size, lightness, high energy density, and frequent charging operations.

The lithium secondary batteries include a cathode and an anode made of an active material that can induce intercalation and de-intercalation of lithium ions. An organic electrolyte or a polymer electrolyte that allows the movement of the lithium ions is interposed between the cathode and the anode. The lithium secondary batteries generate electric energy by oxidation/reduction due to intercalation/de-intercalation of the lithium ions in the cathode and the anode.

The cathode of the lithium secondary batteries has a potential higher than the electrode potential of lithium, by as much as about 3 to 4.5 V, and is mainly made of complex oxide of lithium with transition metal for intercalation/de-intercalation of the lithium ions. For example, lithium cobalt oxide ($LiCoO_2$), lithium nickel oxide ($LiNiO_2$), and lithium manganese oxide ($LiMnO_2$) are mainly used as a cathode material. On the other hand, the anode is mainly made of a lithium metal, a lithium alloy, or a carbonaceous material that exhibits a chemical potential similar to the lithium metal upon the intercalation/de-intercalation of the lithium ions, so as to reversibly receive or emit the lithium ions while maintaining structural and electrical properties.

The lithium secondary batteries are classified into lithium ion batteries (LIBs) and lithium polymer batteries (LPBs) according to the types of electrolytes. While the lithium ion batteries use a liquid electrolyte/separation film system, the lithium polymer batteries use a polymer electrolyte. In particular, the lithium polymer batteries can be sub-classified into lithium metal polymer batteries (LMPBs) using a lithium metal as an anode and lithium ion polymer batteries (LIPBs) using carbon as an anode. In the lithium ion batteries using a liquid electrolyte, there arise problems due to instability of the liquid electrolyte. Although alternatives such as use of an electrode material capable of compensating for the instability of the liquid electrolyte or installation of a safety apparatus can be considered, a manufacture cost increases and it is difficult to increase the capacity of the batteries. On the contrary, the lithium polymer batteries have many advantages such as low manufacture cost, diversity of size and shape, and high voltage and large capacity by lamination. Therefore, attention has been paid to the lithium polymer batteries as the next generation batteries.

In order for the lithium polymer batteries to be commercially available, the polymer electrolyte must satisfy requirements such as excellent ionic conductivity, mechanical properties, and interfacial stability between it and electrodes. In particular, in the lithium metal polymer batteries, dendritic growth of lithium on a lithium anode, formation of dead lithium, interfacial phenomenon between the lithium anode and the polymer electrolyte, etc. adversely affects the stability and cycle characteristics of the batteries. In view of these problems, various polymer electrolytes have been developed.

At an initial development stage of polymer electrolytes, solventless polymer electrolytes had been mainly studied. The solventless polymer electrolytes are manufactured by dissolving a mixture of a salt with polyethylene oxide or polypropylene oxide in a co-solvent, followed by casting (see EP78505 and U.S. Pat. No. 5,102,752). However, the solventless polymer electrolytes have very low ionic conductivity at room temperature.

Gel polymer electrolytes are another example of the polymer electrolytes. The gel polymer electrolytes have high ionic conductivity of more than $10^{-3}$ S/cm, and are manufactured in the form of a film after dissolving a salt and a common polymer such as polyacrylonitrile, polymethylmethacrylate, polyvinylchloride, and polyvinylidene fluoride in an organic solvent such as ethylene carbonate and propylene carbonate and a co-solvent [K. M. Abraham et al., J. Electrochem. Soc., 142, 1789, 1995]. However, these gel polymer electrolytes involve automation process-related problems such as deterioration of mechanical properties due to the used organic solvent, a need of a specific process condition when actually used for the lithium polymer batteries, and removal of the co-solvent.

Recently, there has been disclosed a method of manufacturing lithium secondary batteries, which includes: preparing a porous polymer matrix, laminating a cathode, the porous polymer matrix, and an anode to produce a laminate, and impregnating the laminate with an electrolyte solution [J. M. Tarascon et al., Solid State Ionics, 86-88, 49, 1996; and U.S. Pat. No. 5,456,000]. In this case, although ionic conductivity is slightly enhanced, mechanical properties are little enhanced.

In spite of numerous attempts to improve the physicochemical properties of polymer electrolytes as described above, current polymer electrolytes still exhibit low ionic conductivity and insufficient mechanical properties, as compared to the electrolyte solution/separation film system of the lithium ion batteries. This is because due to compatibility between a polymer matrix and an electrolyte solution, an electrolyte film becomes flexible as impregnation of the polymer matrix with the electrolyte solution increases. Also, since the electrolyte film has more compact microporous morphology relative to the separation film, an ion transfer path is curved, and thus, an ion transfer distance becomes long. For this reason, the lithium metal polymer batteries exhibit drastically low ionic conductivity, relative to the lithium ion batteries, even though dendritic growth of lithium at a surface of a lithium anode is slightly prevented. Therefore, thin film formation for the polymer electrolyte is difficult and the total resistance of batteries is increased, thereby lowering high rate charge/discharge characteristics and cycle stability in high current density condition.

SUMMARY OF THE INVENTION

The present invention provides a thin film composite polymer electrolyte for a lithium secondary battery, which has excellent high rate discharge characteristics and high power characteristics by remarkably enhanced ionic conductivity, and strengthened mechanical properties.

The present invention also provides a simple method of manufacturing a thin film composite polymer electrolyte for a lithium secondary battery, which has strengthened mechanical properties and enhanced ionic conductivity.

According to an aspect of the present invention, there is provided a composite polymer electrolyte for a lithium secondary battery, which includes a first polymer matrix and a second polymer matrix. The first polymer matrix is made of a first porous polymer with a first pore size. The second polymer matrix includes a second porous polymer with a second pore size smaller than the first pore size and a lithium cationic single-ion conducting inorganic filler. The first polymer matrix and the second polymer matrix are impregnated with an electrolyte solution. A lithium salt is dissolved in the electrolyte solution.

The lithium cationic single-ion conducting inorganic filler includes an inorganic filler particle and an ionic hydrophilic group introduced onto a surface of the inorganic filler particle. The lithium cationic single-ion conducting inorganic filler may further include a hydrophobic group introduced onto the surface of the inorganic filler particle.

According to another aspect of the present invention, there is provided a method of manufacturing a composite polymer electrolyte for a lithium secondary battery, the method including: forming a first polymer matrix made of a first porous polymer with a first pore size; synthesizing a lithium cationic single-ion conducting inorganic filler using an inorganic filler particle as a starting material; dissolving a second porous polymer with a second pore size smaller than the first pore size and the lithium cationic single-ion conducting inorganic filler in a co-solvent to prepare a mixed solution; coating the first polymer matrix with the mixed solution to form a second polymer matrix on the first polymer matrix; and impregnating the first polymer matrix and the second polymer matrix with an electrolyte solution.

The operation of synthesizing the lithium cationic single-ion conducting inorganic filler may include: substituting a surface hydroxyl group (—OH) of the inorganic filler particle by a functional group containing a sulfonic acid group (—$SO_3H$) or a carboxyl group (—COOH) and substituting a proton ($H^+$) of the sulfonic acid group (—$SO_3H$) or carboxyl group (—COOH) by a lithium ion ($Li^+$).

A composite polymer matrix structure constituting a polymer electrolyte for a lithium secondary battery according to the present invention acts as a main ion-conducting medium and includes a first polymer matrix with good mechanical strength and a micro-scale pore size. The composite polymer matrix structure also includes a second polymer matrix with a submicro-scale pore size that can control interfacial phenomenon between the electrolyte and a lithium anode by adjusting the distribution of an electrolyte solution. To prevent an increase of inner resistance during charge and discharging cycling and increase high rate discharge characteristics, a lithium cationic single-ion conducting inorganic filler is introduced to the second polymer matrix. The lithium cationic single-ion conducting inorganic filler can serve as an inorganic filler and as a lithium cationic single-ion conductor. Therefore, the composite polymer matrix structure can strengthen mechanical properties and the second polymer matrix with a submicro-scale pore size and containing the lithium cationic single-ion conducting inorganic filler can remarkably enhance ionic conductivity. Furthermore, erosion of a lithium anode and dendritic growth of lithium on a surface of the lithium anode can be prevented, thereby preventing short-circuit of a battery. Still furthermore, high rate charge/discharge cycling characteristics, high power characteristics, and stability in a high current density condition of a lithium metal polymer secondary battery can be remarkably enhanced. The polymer electrolyte for a lithium secondary battery according to the present invention can be manufactured in the form of an ultra-thin film and a manufacture process is also simplified.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
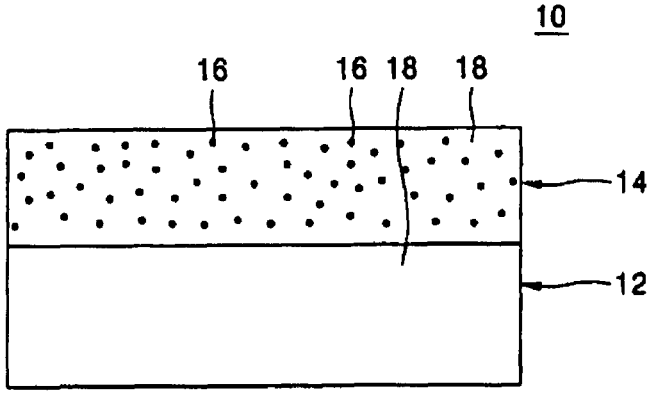
FIG. 1 illustrates a schematic structure of a composite polymer electrolyte for a lithium secondary battery according to an exemplary embodiment of the present invention.

FIG. 1 illustrates a schematic structure of a composite polymer electrolyte 10 for a lithium secondary battery according to an exemplary embodiment of the present invention.

Referring to FIG. 1, the composite polymer electrolyte 10 for a lithium secondary battery according to the present invention includes a first polymer matrix 12 made of a first porous polymer with a first pore size (micro-scale) and a second polymer matrix 14 coated on a surface of the first polymer matrix 12. The second polymer matrix 14 is made of a second porous polymer with a second pore size (submicro-scale) smaller than the first pore size. The second polymer matrix 14 contains a lithium cationic single-ion conducting inorganic filler 16. Preferably, the first polymer matrix 12 has a thickness of about 1 to 25 μm and the second polymer matrix 14 has a thickness of about 0.1 to 15 μm.

The first polymer matrix 12 and the second polymer matrix 14 are impregnated with an electrolyte solution 18.

The first porous polymer constituting the first polymer matrix 12 may be polyethylene, polypropylene, polyimide, polysulfone, polyurethane, polyvinylchloride, cellulose, nylon, polyacrylonitrile, polyvinylidene fluoride, polytetrafluoroethylene, a copolymer or blend thereof.

The second porous polymer constituting the second polymer matrix 14 may be a vinylidene fluoride based polymer, an acrylate based polymer, a copolymer or blend thereof. Preferably, the second porous polymer is a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinylacetate, polyethylene oxide, polypropylene oxide, a copolymer or blend thereof.

The lithium cationic single-ion conducting inorganic filler 16 has such a structure that a lithium cationic single ion-containing hydrophilic group is bonded to surfaces of inorganic filler particles. When needed, the lithium cationic single-ion conducting inorganic filler 16 may have such a structure that a lithium cationic single ion-containing hydrophilic group and a hydrophobic group are simultaneously bonded to surfaces of inorganic filler particles.

Figure 2:
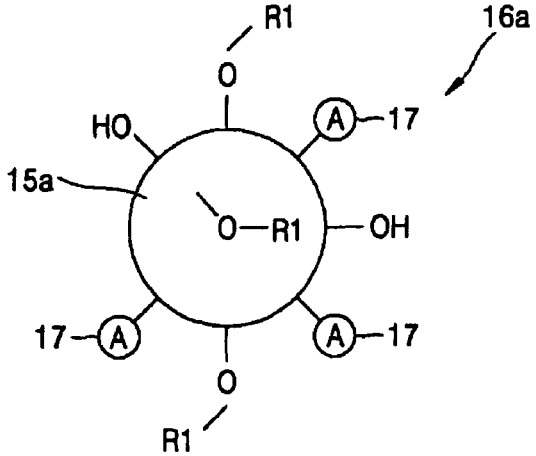
FIG. 2 illustrates an example of a lithium cationic single-ion conducting inorganic filler that can be contained in a second polymer matrix of a composite polymer electrolyte for a lithium secondary battery according to an exemplary embodiment of the present invention.

FIG. 2 illustrates a structure of a lithium cationic single-ion conducting inorganic filler 16a that can be contained in the second polymer matrix 14 according to an embodiment of the present invention.

In the lithium cationic single-ion conducting inorganic filler 16a of FIG. 2, an inorganic filler particle 15a previously substituted by a hydrophilic group such as a hydroxyl group (—OH) and a hydrophobic group 17 is used as a staring material. In this case, the lithium cationic single-ion conducting inorganic filler 16a is obtained by introduction of only a lithium cationic single ion-containing hydrophilic group R1 onto a surface of the inorganic filler particle 15a. The ionic hydrophilic group R1 may be a Li-substituted sulfonic acid group ($—SO_3^-Li^+$) or a Li-substituted carboxyl group ($—COO^-Li^+$).

Figure 3:
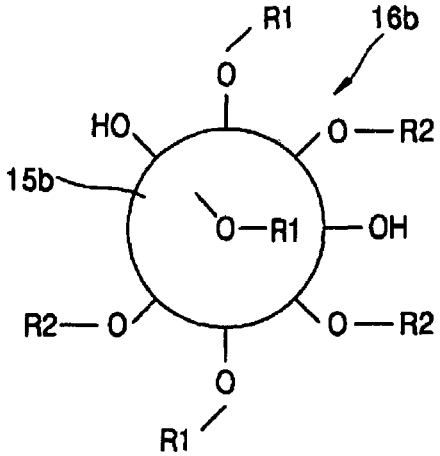
FIG. 3 illustrates another example of a lithium cationic single-ion conducting inorganic filler that can be contained in a second polymer matrix of a composite polymer electrolyte for a lithium secondary battery according to an exemplary embodiment of the present invention.

FIG. 3 illustrates a structure of a lithium cationic single-ion conducting inorganic filler 16b that can be contained in the second polymer matrix 14 according to another embodiment of the present invention.

In the lithium cationic single-ion conducting inorganic filler 16b of FIG. 3, an inorganic filler particle 15b with only a surface hydrophilic group such as a hydroxyl group (—OH) is used as a starting material. In this case, the lithium cationic single-ion conducting inorganic filler 16b is obtained by simultaneous introduction of an ionic hydrophilic group R1 as described above and a hydrophobic group R2 onto a surface of the inorganic filler particle 15b. The hydrophobic group R2 serves to facilitate particle dispersion. At this time, the content of ions that can be introduced onto the surface of the inorganic filler particle 15b can be adjusted by adjusting the relative ratio of the ionic hydrophilic group R1 and the hydrophobic group R2.

The inorganic filler particle 15a or 15b suitable for formation of the lithium cationic single-ion conducting inorganic filler 16a or 16b may be silica, talc, alumina ($Al_2O_3$), γ-$LiAlO_2$, $TiO_2$, zeolite, molybdenum phosphate hydrate, or tungsten phosphate hydrate.

In FIGS. 2 and 3, the ionic hydrophilic group R1 may be $SO_3^-Li^+$, $SO_2C_6H_4COO^-Li^+$, $C_6H_3(SO_2NH_2)COO^-Li^+$, $CH(COO^-C_6H_3(OH)COO^-Li^+$, $C_6H_2(NO_2)_2COO^-Li^+$, $CH_2C(CH_3)_2COO^-Li^+$, $Si(CH_3)_2(CH_2)_XC(CF_3)_2(CF_2)_Y SO_3^-Li^+$, $Si(CH_3)_2(CH_2)_XC(CF_3)_2(CF_2)_YCOO^-Li^{+s}$, $Si(CH_2)_XC(CF_3)_2(CF_2)_YSO_3^-Li^+$, $Si(CH_2)_XC(CF_3)_2(CF_2)_Y COO^-Li^+$, $Si(CF_3)_2(CF_2)_YSO_3^-Li^+$, $Si(CF_3)_2(CF_2)_YCOO^- Li^+$, $Si(CF_2)_YSO_3^-Li^+$, $Si(CF_2)_YCOO^-Li^+$, or the like. Here, X and Y are each independently an integer of 0 to 10.

In FIG. 3, the hydrophobic group R2 may be selected from $(CH_2)_3CH_3$, $(CH_2)_5CH_3$, $(CH_2)_6CH_3$, $Si(CH_3)_2C_2H_5$, $CF_2CH_3$, $C_2H_5$, $Si(C_2H_5)_3$, $Si(CH_3)_3$, $Si(CH_3)_2C(CH_3)_2CH (CH_3)_2$, $SCN(CH_3)_2$, $Si(C_6H_5)_2CH_3$, $Si(CH_3)_2C_6H_5$, $SiH (CH_3)_2$, and $Si(CH_3)_2CH{=}CH_2$.

In the inorganic filler particle 15a, a single- or multiple-species functional group may be used as the ionic hydrophilic group R1. In the inorganic filler particle 15b, a single- or multiple-species functional group may be used as each of the ionic hydrophilic group R1 and the hydrophobic group R2.

The introduction ratio of the ionic hydrophilic group R1 on each surface of the inorganic filler particles 15a and 15b may be about 0.001 to 99.999 wt %, preferably about 0.01 to 50 wt %.

The lithium cationic single-ion conducting inorganic filler 16 is used in an amount of 1 to 100 wt %, preferably about 1 to 50 wt %, based on the total weight of polymers constituting the second polymer matrix 14.

The electrolyte solution 18 is impregnated into the first polymer matrix 12 and the second polymer matrix 14 in an amount of about 1 to 1,000 wt %, preferably about 1 to 500 wt %, based on the total weight of polymers constituting the first polymer matrix 12 and the second polymer matrix 14.

The electrolyte solution 18 may be made of ethylene carbonate, propylene carbonate, dimethyl carbonate, diethyl carbonate, methylethyl carbonate, tetrahydrofuran, 2-methyltetrahydrofuran, dimethoxyethane, methyl formate, ethyl formate, gamma-butyrolactone, or a mixture thereof.

A lithium salt is dissolved in the electrolyte solution 18 in an amount of about 1 to 200 wt %, preferably about 1 to 100 wt %, based on the total weight of polymers constituting the first polymer matrix 12 and the second polymer matrix 14.

The lithium salt may be at least one selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), and lithium trifluoromethanesulfonylimide ($LiN(CF_3SO_2)_2$).

Figure 4:
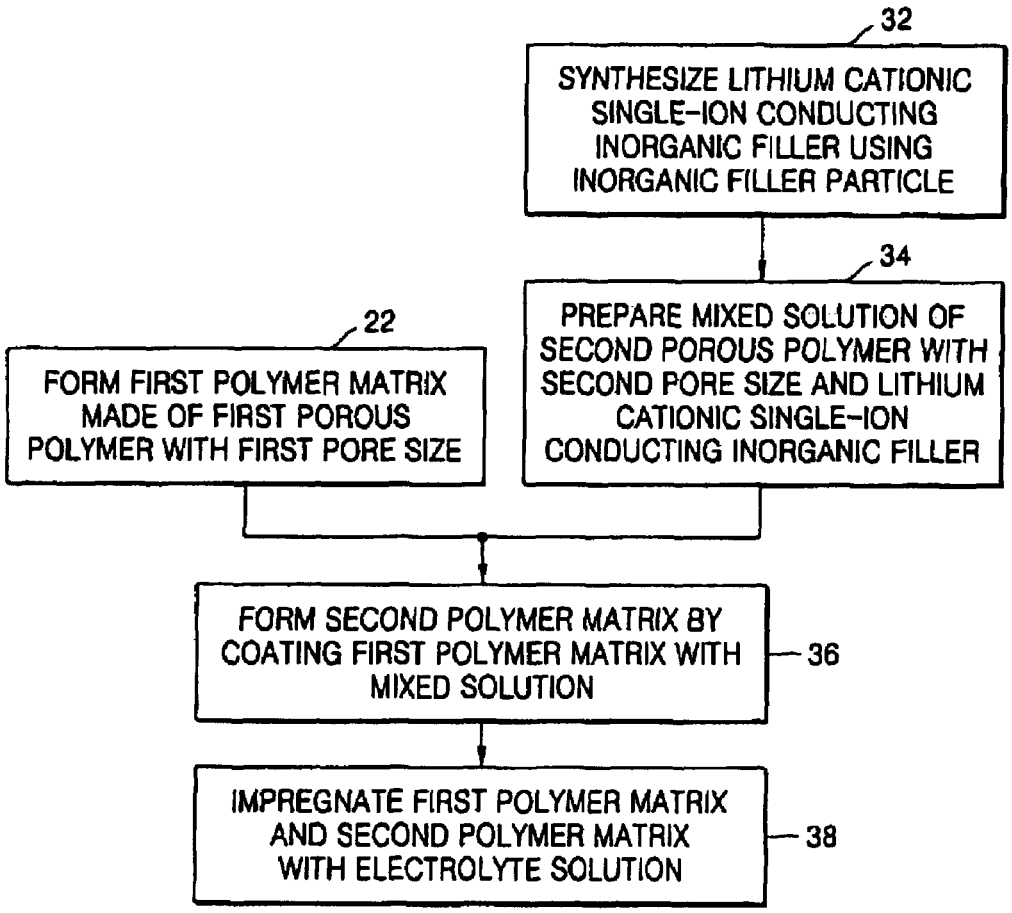
FIG. 4 is a flowchart that illustrates a method of manufacturing a composite polymer electrolyte for a lithium secondary battery according to an exemplary embodiment of the present invention.

FIG. 4 is a flowchart that illustrates a method of manufacturing a composite polymer electrolyte for a lithium secondary battery according to an exemplary embodiment of the present invention. A method of manufacturing a composite polymer electrolyte for a lithium secondary battery according to an embodiment of the present invention will now be described with reference to FIGS. 1 through 4.

In operation 22, the first polymer matrix 12 made of the first porous polymer of the first pore size with micro-scale morphology is formed. The first polymer matrix 12 may be formed to a thickness of about 1 to 25 μl.

In operation 32, the lithium cationic single-ion conducting inorganic filler 16a or 16b shown in FIG. 2 or 3 is synthesized using the inorganic filler particle 15a or 15b as a starting material. For this, a hydrogen atom (H) of a surface hydroxyl group (—OH) of the inorganic filler particle 15a or 15b is substituted by only the ionic hydrophilic group R1 or both the ionic hydrophilic group R1 and the hydrophobic group R2.

At this time, in the case of the inorganic filler particle 15a previously substituted by the hydrophobic group 17 as described above with reference to FIG. 2, only the ionic hydrophilic group R1 is introduced. For this, the surface hydroxyl group (—OH) of the inorganic filler particle 15a is substituted by a single- or multiple-species group containing a sulfonic acid group ($—SO_3H$) or a carboxyl group (—COOH). Then, proton ($H^+$) of the introduced sulfonic acid group ($—SO_3H$) or carboxyl group (—COOH) is substituted by lithium ion ($Li^+$) by neutralization to synthesize the lithium cationic single-ion conducting, inorganic filler 16 containing a $—SO_3^-Li^+$ or $—COO^-Li^+$ group.

Figure 5:
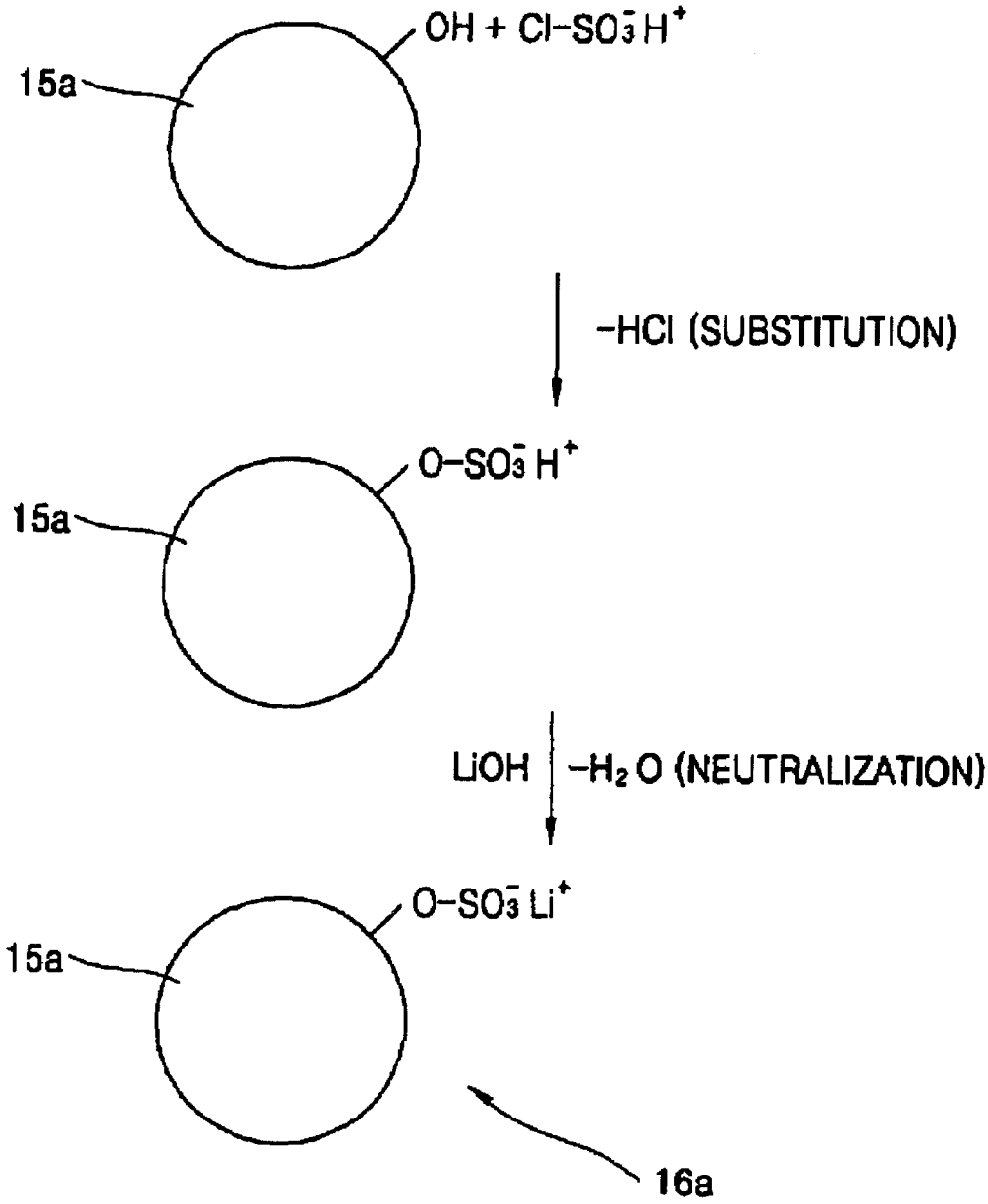
FIG. 5 schematically illustrates the introduction of ionic hydrophilic groups onto surfaces of inorganic filler particles in a method of manufacturing a composite polymer electrolyte for a lithium secondary battery according to an exemplary embodiment of the present invention.

FIG. 5 schematically illustrates the introduction of an ionic hydrophilic group onto the surface of an inorganic filler particle 15a.

Referring to FIG. 5, a surface hydroxyl group (—OH) of the inorganic filler particle 15a is substituted by a sulfonic acid group ($—SO_3H$) and proton ($H^+$) of the introduced sulfonic acid group ($—SO_3H$) is substituted by lithium ion ($Li^+$) by neutralization to synthesize a lithium cationic single-ion conducting inorganic filler 16a in which an ionic lithium sulfonate group is introduced onto the surface of the inorganic filler particle 15a.

In a case where hydrophobic surface treated silica, talc, alumina ($Al_2O_3$), γ-$LiAlO_2$, $TiO_2$, zeolite, molybdenum phosphate hydrate, or tungsten phosphate hydrate is used as the inorganic filler particle 15a, the ionic hydrophobic group R1 that can be introduced onto the surface of the inorganic filler particle 15a may be $SO_3^-Li^+$, $SO_2C_6H_4COO^-Li^+$, $C_6H_3(SO_2NH_2)COO^-Li^+$, $CH(COO^-Li^+)CH_2COO^-Li^+$, $C_6H_3(OH)COO^-Li^+$, $C_6H_2(NO_2)_2COO^-Li^+$, $CH_2C(CH_3)_2COO^-Li^+$, $Si(CH_3)_2(CH_2)_XC(CF_3)_2(CF_2)_YSO_3^-Li^+$, $Si(CH_3)_2(CH_2)_XC(CF_3)_2(CF_2)_YCOO^-Li^+$, $Si(CH_2)_XC(CF_3)_2(CF_2)_YSO_3^-Li^+$, $Si(CH_2)_XC(CF_3)_2(CF_2)_YCOO^-Li^+$, $Si(CF_3)_2(CF_2)_Y SO_3^-Li^+$, $Si(CF_3)_2(CF_2)_YCOO^-Li^+$, $Si(CF_2)_YSO_3^-Li^+$, $Si(CF_2)_YCOO^-Li^+$, or the like. Here, X and Y are each independently an integer from 0 to 1.0.

In the case of using the inorganic filler particle 15b with only a hydrophilic group such as a hydroxyl group (—OH) as described above with reference to FIG. 3, the ionic hydrophilic group R1 and the hydrophobic group R2 are simultaneously introduced to facilitate particle dispersion. For example, in a case where silica, talc, alumina ($Al_2O_3$), γ-$LiAlO_2$, $TiO_2$, zeolite, molybdenum phosphate hydrate, or tungsten phosphate hydrate, a surface of which has only a hydrophilic group such as hydroxyl group (—OH), is used as the inorganic filler particle 15b, the ionic hydrophilic group R1 that can be introduced onto the surface of the inorganic filler particle 15b may be at least one selected from the above-exemplified ionic groups and the hydrophobic group R2 that can be introduced onto the surface of the inorganic filler particle 15b to facilitate particle dispersion may be at least one selected from $(CH_2)_3CH_3$, $(CH_2)_5CH_3$, $(CH_2)_6CH_3$, $Si(CH_3)_2C_2H_5$, $CF_2CH_3$, $C_2H_5$, $Si(C_2H_5)_3$, $Si(CH_3)_3$, $Si(CH_3)_2C(CH_3)_2CH(CH_3)_2$, $SCN(CH_3)_2$, $Si(C_6H_5)_2CH_3$, $Si(CH_3)_2C_6H_5$, $SiH(CH_3)_2$, and $Si(CH_3)_2CH{=}CH_2$. At this time, the content of ions to be introduced onto the surface of the inorganic filler particle 15b is adjusted by adjusting the ratio of the ionic hydrophilic group R1 and the hydrophobic group R2.

In operation 34, a second porous polymer with a second pore size and the lithium cationic single-ion conducting inorganic filler 16 obtained in operation 32 are mixed in a predetermined ratio and dissolved in a co-solvent to prepare a uniform mixed solution.

Here, the co-solvent may be selected from the group consisting of acetone, dimethylformamide, dimethylsulfoxide, N-methylpyrrolidone, and a mixture thereof.

Since there is no particular limitation on an execution sequence of operations 22 and 34, one of the two operations can be preferentially carried out over the other according to a process design.

In operation 36, the mixed solution obtained in operation 34 is coated on a surface of the first polymer matrix 12 obtained in operation 22 to the second polymer matrix 14. The second polymer matrix 14 may be formed to a thickness of about 0.1 to 15 μm. As a result, a composite polymer matrix bilayer structure comprised of the first polymer matrix 12 and the second polymer matrix 14 that are different in morphologies by different pore sizes is produced.

In operation 38, the first polymer matrix 12 and the second polymer matrix 14 are impregnated with the electrolyte solution 18 to complete the composite polymer electrolyte 10 as shown in FIG. 1.

Hereinafter, methods of manufacturing composite polymer electrolytes for lithium secondary batteries according to the present invention will be described more specifically by way of Examples. It is, however, to be borne in mind that the following Examples are provided only for illustrations and thus the present invention is by no means limited to or by them.

EXAMPLE 1

In order to synthesize a lithium cationic single-ion conducting inorganic filler with the same structure as shown in FIG. 2, 10 g of a hydrophobic surface treated silica (TS-610, CAB-O-SIL®) was dispersed in 400 mL of 1,2-dichloroethane and then vigorously stirred in a reactor at more than 400 rpm under a nitrogen atmosphere. At this time, a solution of chlorosulfonic acid ($Cl—SO_3H$) in 1,2-dichloroethane was gradually added to the resultant mixture and stirred for about 24 hours. A resultant polymer obtained by filtration of the reaction solution was dried, washed three times, and neutralized in a lithium hydroxide (LiOH) solution, to finally obtain a lithium cationic single-ion conducting inorganic filler.

EXAMPLE 2

In order to synthesize a lithium cationic single-ion conducting inorganic filler with the same structure as shown in FIG. 3, 10 g of hydrophilic silica (AEROSIL® 200, Degussa) with only a surface hydroxyl group (—OH) was dispersed in 400 mL of 1,2-dichloroethane and then vigorously stirred in a reactor at more than 400 rpm under a nitrogen atmosphere. At this time, a solution of chlorosulfonic acid ($Cl—SO_3H$) and chlorotrimethylsilane ($Cl—Si(CH_3)_3$) in 1,2-dichloroethane was gradually added to the resultant mixture and stirred for 24 hours. A resultant polymer obtained by filtration of the reaction solution was dried, washed three times, and neutralized in a lithium hydroxide (LiOH) solution, to finally obtain a lithium cationic single-ion conducting inorganic filler.

EXAMPLE 3

In order to manufacture a composite polymer electrolyte for a lithium secondary battery, first, a copolymer of vinylidene fluoride and hexafluoropropylene was dissolved with the lithium cationic single-ion conducting inorganic filler obtained in Example 1 as shown in FIG. 2 in acetone used as a co-solvent to obtain a uniform mixed solution. Here, the lithium cationic single-ion conducting inorganic filler was contained in the mixed solution in an amount of 5 wt %, based on the total weight of polymers in the mixed solution. The mixed solution was cast on a porous polyethylene film with a thickness of 25 μm and the co-solvent was then evaporated. As a result, a composite polymer matrix bilayer structure in which a compact microporous polymer matrix was coated on a surface of the porous polyethylene film was obtained. The obtained composite polymer matrix structure was transferred into a glove box of an argon atmosphere and then immersed in an electrolyte solution in which 1M lithium hexafluorophosphate was contained in a mixture solvent (1:1, molar ratio of ethylene carbonate and dimethyl carbonate), to produce a polymer electrolyte.

EXAMPLE 4

A polymer electrolyte was manufactured in the same manner as in Example 3 except that the lithium cationic single-ion conducting inorganic filler was contained in the mixed solution in an amount of 10 wt %, based on the total weight of polymers in the mixed solution.

EXAMPLE 5

A polymer electrolyte was manufactured in the same manner as in Example 3 except that the lithium cationic single-ion conducting inorganic filler was contained in the mixed solution in an amount of 20 wt %, based on the total weight of polymers in the mixed solution.

EXAMPLE 6

A polymer electrolyte was manufactured in the same manner as in Example 3 except that the lithium cationic single-ion conducting inorganic filler was contained in the mixed solution in an amount of 30 wt %, based on the total weight of polymers in the mixed solution.

COMPARATIVE EXAMPLE

In order to perform characteristics comparison with the polymer electrolytes obtained in Examples 3-6, a porous polyethylene film with a thickness of 25 μm was immersed in an electrolyte solution in which 1M lithium hexafluorophosphate was contained in a mixture solvent (1:1, molar ratio of ethylene carbonate and dimethyl carbonate), to produce a separation film/liquid electrolyte system.

EXAMPLE 7

In order to measure a charge/discharge cycle, individual unit batteries were manufactured using the composite polymer electrolyte obtained in Example 5 and the separation film/liquid electrolyte system obtained in Comparative Example. There were used cathode plates made of a mixture of 80 wt % of lithium-manganese-nickel oxide powders, 12 wt % of a conductive agent, and 8 wt % of a binder. Lithium metal foils were used as anode plates. Charge/discharge characteristics were evaluated by repeating charge/discharge cycles in such a way that charging was carried out until 4.8 V and then discharging was carried out until 2.0 V, under a fixed charge current density of 2.5 mA (C/2 rate) and different discharge current densities of 2.5 mA (C/2 rate), 5 mA (C rate), 10 mA (2C rate), and 15 mA (3C rate). Furthermore, cycle stability was evaluated under a fixed current density of 15 mA (3C rate).

Figure 6:
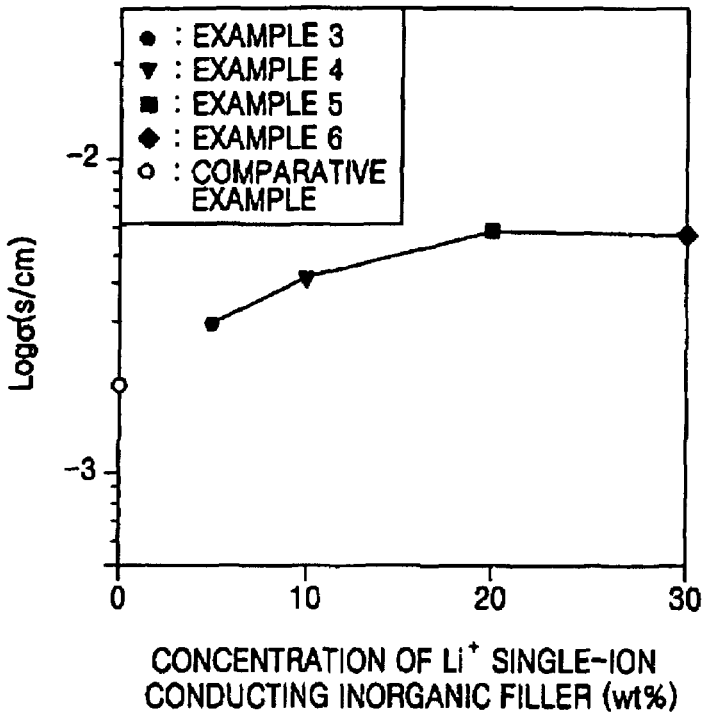
FIG. 6 is a graph showing the room temperature ionic conductivity of composite polymer electrolytes according to the present invention.

FIG. 6 is a graph showing the room-temperature ionic conductivity of composite polymer electrolytes according to the present invention and the separation film/liquid electrolyte system of Comparative Example. Here, the composite polymer electrolytes obtained in Examples 3, 4, 5, and 6 were used as the composite polymer electrolytes according to the present invention. The obtained results were compared with that of Comparative Example. As can be seen from FIG. 6, the composite polymer electrolytes obtained in Examples 3, 4, 5, and 6 exhibited excellent ionic conductivity, as compared to the separation film/liquid electrolyte system of Comparative Example.

Figure 7:
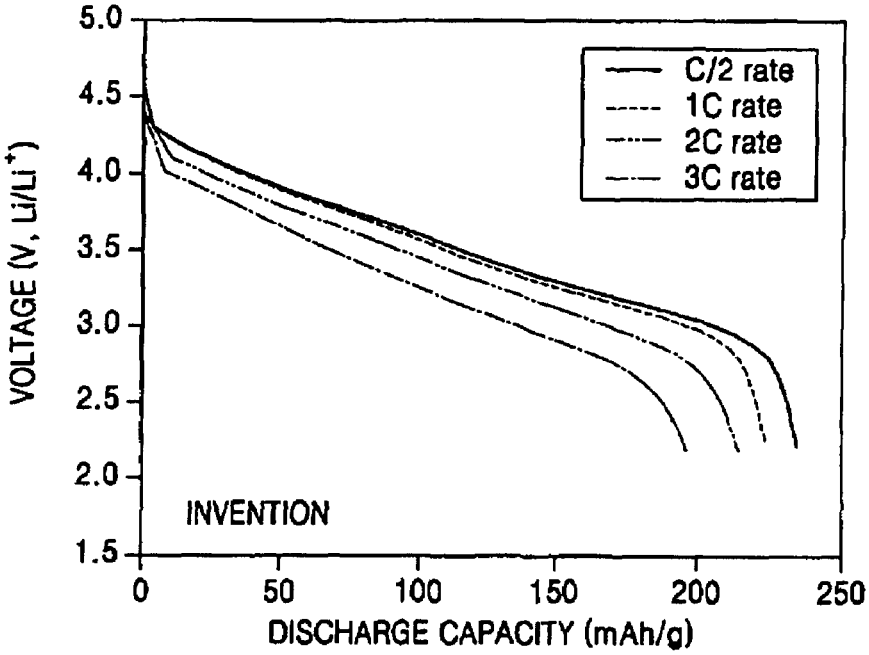
FIG. 7 is a graph showing high rate charge/discharge characteristics of a unit battery using a composite polymer electrolyte according to the present invention.
Figure 8:
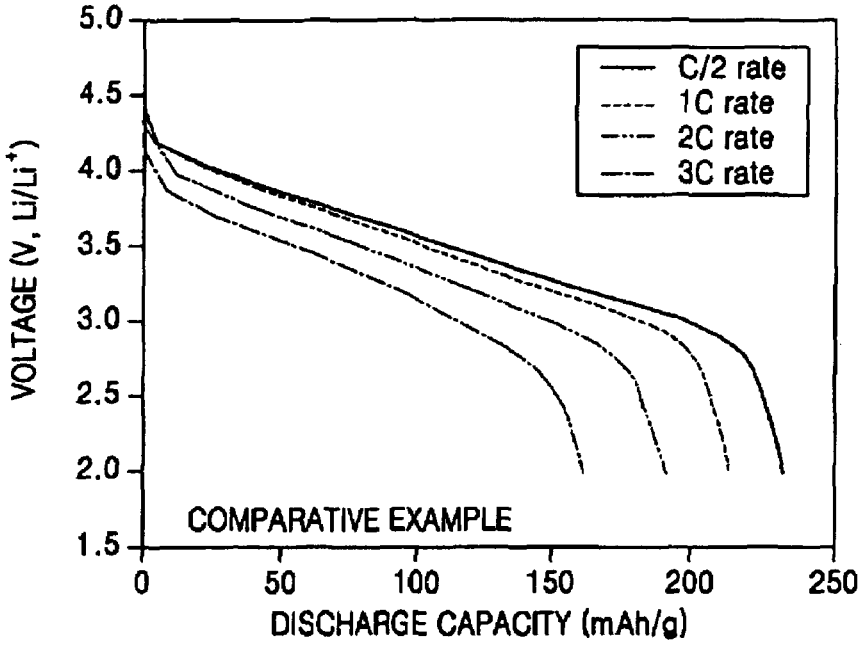
FIG. 8 is a graph showing high rate charge/discharge characteristics of a unit battery using a polymer electrolyte according to Comparative Example.

FIG. 7 is a graph showing high rate charge/discharge characteristics of a unit battery using the composite polymer electrolyte of Example 5 and FIG. 8 is a graph showing high rate charge/discharge characteristics of a unit battery using the separation film/liquid electrolyte system of Comparative Example. FIGS. 7 and 8 show the evaluation results of high rate discharge capacities of the unit batteries with varying current density from 2.5 to 15 mA. As shown in FIGS. 7 and 8, the unit battery using the composite polymer electrolyte according to the present invention (FIG. 7) exhibited a significant decrease in reduction rate of discharge capacity with increase of current density, as compared to Comparative Example (FIG. 8).

Figure 9:
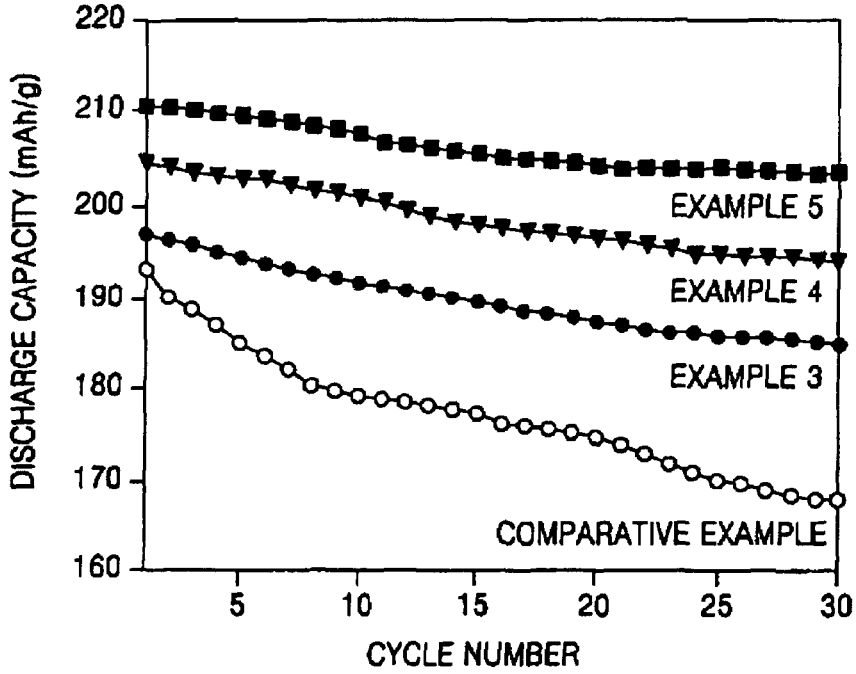
FIG. 9 is a graph showing cycle performance of unit batteries using composite polymer electrolytes according to the present invention and a polymer electrolyte according to Comparative Example.

FIG. 9 is a graph showing cycle performance of unit batteries using the composite polymer electrolytes obtained in Examples 3, 4, and 5. The evaluation result for Comparative Example is also shown in FIG. 9. As shown in FIG. 9, the unit batteries using the composite polymer electrolytes according to the present invention exhibited the maintenance ability of excellent discharge capacity under a high current density condition (10 mA (2C rate)), as compared to Comparative Example.

As apparent from the above description, a polymer electrolyte for a lithium metal polymer secondary battery according to the present invention includes a composite polymer matrix bilayer structure. The composite polymer matrix structure includes a first polymer matrix with good mechanical properties and a second polymer matrix with more compact porous structure (submicro-scale) than the first polymer matrix, coated on a surface of the first polymer matrix. To solve the problems of increase of battery thickness due to introduction of the second polymer matrix and increase of inner resistance due to compact microporous characteristics, a lithium cationic single-ion conducting inorganic filler is introduced into the second polymer matrix. The introduction of the lithium cationic single-ion conducting inorganic filler can enhance distribution uniformity of an impregnated electrolyte and maintenance characteristics, simultaneously with increasing ionic conductivity characteristics. Also, the lithium cationic single-ion conducting inorganic filler is helpful in forming the submicro-scale porous structure of the second polymer matrix. Furthermore, when a mixed solution containing a second porous polymer is coated on the first polymer matrix, the lithium cationic single-ion conducting inorganic filler can enhance surface wettability, thereby enhancing the dispersion characteristics and uniformity of the mixed solution.

In addition, the polymer electrolyte for a lithium secondary battery according to the present invention can prevent erosion of a lithium anode and dendritic growth of lithium on a surface of the lithium anode by uniform electrolyte distribution in the second polymer matrix, thereby preventing a battery short-circuit. Also, charge/discharge cycle performance and stability of a lithium metal polymer secondary battery can be remarkably enhanced. The polymer electrolyte for a lithium secondary battery according to the present invention can be manufactured in the form of an ultra-thin film. Post-injection of the electrolyte solution can simplify a manufacture process, thereby increasing a process yield.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite polymer electrolyte for a lithium secondary batterycomprising:

a first polymer matrix made of a first porous polymer with a first pore size;

a second polymer matrix comprising a second porous polymer with a second pore size smaller than the first pore size and a lithium cationic single-ion conducting inorganic filler, the lithium cationic single-ion conducting inorganic filler comprises an inorganic filler particle and an ionic hydrophilic group containing a Li cationic single ion introduced onto a surface of the inorganic filler particle; and an electrolyte solution impregnated into the first polymer matrix and the second polymer matrix.

2. The composite polymer electrolyte of claim 1, wherein the inorganic filler particle is selected from the group consisting of silica, talc, alumina ($Al_2O_3$), y -$LiAlO_2$, $Ti0_2$, zeolite, molybdenum phosphate hydrate, and tungsten phosphate hydrate.

3. The composite polymer electrolyte of claim 1, wherein an introduction ratio of the ionic hydrophilic group on the surface of the inorganic filler particle is 0.001 to 99.999wt %.

4. The composite polymer electrolyte of claim 1, wherein the ionic hydrophilic group is a single- or a multiple-species functional group selected from $SO_3Li^+$, $SO2C_6H_4COO^-Li^+$, $C_6H_3(SO_2NH_2)COO^-Li^+$, [$CH(COO^-Li)CH_2COO^-Li$+] $CH(COO^-Li)CH_2COO^-Li^+$, $C_6H_3(OH)COO^-Li^+$, $C_6H_3(OH)COO^-Li^+$, [$C_6H_2(NO_2)_2COO^-Li$+] $C_6H_2(NO_2)_2COO^-Li^+$, $CH_2C(CH_3)_2COO^-Li^+$, $Si(CH_3)_2(CH_2)xC(CF_3)_2(CF_2)ySO_3^-Li^+$, $Si(CH_3)_2(CH_2)xC(CF_3)_2(CF_2)yCOO^{31}$ $Li+$, $Si(CH_2)xC(CF_3)_2(CF_2)ySO_3^-Li^+$, $Si(CH_2)xC(CF_3)_2(CF_2)yCOO^-Li^+$, $Si(CF_3)_2(CF_2)ySO_3^-Li^+$, [Si(CF3)2(CF2)yCOO−Li+] $Si(CF_3)_2(CF_2)yCOO^-Li^+$, [Si(CF2)ySO3−Li+]$Si(CF_2)ySO^{3-}Li^+$, and [Si(CF2)y COO −L1+] $Si(CF^2)y\ COO^-L1^+$, where X and Y are each independently an integer of 0 to 10.

5. The composite polymer electrolyte of claim 1, wherein the lithium cationic single-ion conducting inorganic filler further comprises a hydrophobic group introduced onto the surface of the inorganic filler particle.

6. The composite polymer electrolyte of claim 5, wherein the hydrophobic group is a single- or multiple-species group selected from $(CH_2)_3CH_3$, $(CH_2)_5CH_3$, $(CH_2)_6CH_3$, $Si(CH_3)_2\ C_2H_5$, $CF_2CH_3$, $C_2H_5$, $Si(C_2H_5)_3$, $Si(CH_3)_3$, $Si(CH_3)_2C(CH_3)_2CH(CH_3)_2$, $SCN(CH_3)_2$, $Si(C_6H_5)_2CH_3$, $Si(CH_3)_2C_6H_5$, $SiH(CH_3)_2$, and $Si(CH_3)_2CH{=}CH_2$.

7. The composite polymer electrolyte of claim 1, wherein the first porous polymer is polyethylene, polypropylene, polyimide, polysulfone, polyurethane, polyvinylchioride, cellulose, nylon, polyacrylonitrile, polyvinylidene fluoride, polytetrafluoroethylene, a copolymer or blend thereof.

8. The composite polymer electrolyte of claim 1, wherein the second porous polymer is a vinylidene fluoride based polymer, an acrylate based polymer, a copolymer or blend thereof.

9. The composite polymer electrolyte of claim 8, wherein the second porous polymer is a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinylacetate, polyethylene oxide, polypropylene oxide, a copolymer or blend thereof.

10. The composite polymer electrolyte of claim 1, wherein the lithium cationic single-ion conducting inorganic filler is added in an amount of 1 to 100 wt %, based on the total weight of polymers constituting the second polymer matrix.

11. The composite polymer electrolyte of claim 1, wherein the first polymer matrix has a thickness of 1 to 25 μm and the second polymer matrix has a thickness of 0.1 to 15 μm.

12. The composite polymer electrolyte of claim 1, wherein the electrolyte solution is made of ethylene carbonate, propylene carbonate, dimethyl carbonate, diethyl carbonate, methylethyl carbonate, tetrahydrofuran, 2-methyltetrahydrofuran, dimethoxyethane, methyl formate, ethyl formate, gamma-butyrolactone, or a mixture thereof.

13. The composite polymer electrolyte of claim 1, wherein the electrolyte solution is impregnated into the first polymer matrix and the second polymer matrix in an amount of 1 to 1,000 wt %, based on the total weight of polymers constituting the first polymer matrix and the second polymer matrix.

14. The composite polymer electrolyte of claim 1, wherein the electrolyte solution comprises at least one lithium salt selected from the group consisting of lithium perchlorate ($LiClO_4$), lithium triflate ($LiCF_3SO_3$), lithium hexafluorophosphate ($LiPF_6$), *and* lithium tetrafluoroborate ($LiBF_4$)[, and lithium trifluoromethanesulfonylimide ($LiN(CF_3SO_2)_2$)].

15. The composite polymer electrolyte of claim 14, wherein the lithium salt is dissolved in the electrolyte solution[in an amount of 1 to 200 wt %, based on the total weight of polymers constituting the first polymer matrix and the second polymer matrix].

16. A method of manufacturing a composite polymer electrolyte for a lithium secondary battery, the method comprising:

forming a first polymer matrix made of a first porous polymer with a first pore size;

synthesizing a lithium cationic single-ion conducting inorganic filler using an inorganic filler particle as a starting material, the lithium cationic single-ion conducting inorganic filler comprises an inorganic filler particle and an ionic hydrophilic group containing a Li cationic single ion introduced onto a surface of the inorganic filler particle and wherein synthesizing the lithium cationic single-ion conducting inorganic filler comprises substituting a surface hydroxyl group (—OH) of the inorganic filler particle by a functional group containing a sulfonic acid group (—$SO_3H$) or a carboxyl group (—COOH); and substituting a proton ($H^{30}$) of the sulfonic acid group (—$SO_3H$) or carboxyl group (—COOH) by a lithium ion [(Li+)] ($Li^+$);

dissolving a second porous polymer with a second pore size smaller than the first pore size and the lithium cationic single-ion conducting inorganic filler in a co-solvent to prepare a mixed solution;

coating the first polymer matrix with the mixed solution to form a second polymer matrix on the first polymer matrix; and impregnating the first polymer matrix and the second polymer matrix with an electrolyte solution.

17. The method of claim 16, wherein the co-solvent is selected from the group consisting of acetone, dimethylformamide, dimethylsufoxide, N-methylpyrrolidone, and a mixture thereof.

*18. A method of manufacturing a composite polymer electrolyte for a lithium secondary battery, the method comprising:*

*forming a first polymer matrix made of a first porous polymer with a first pore size;*

*synthesizing a lithium cationic single-ion conducting inorganic filler, the lithium cationic single-ion conducting inorganic filler comprising an inorganic filler particle and an ionic hydrophilic group containing a Li cationic single ion introduced onto a surface of the inorganic filler particle;*

*dissolving a second porous polymer with a second pore size and the lithium cationic single-ion conducting inorganic filler in a co-solvent to prepare a mixed solution;*

*coating the first polymer matrix with the mixed solution to form a second polymer matrix; and*

*impregnating the first polymer matrix and the second polymer matrix with an electrolyte solution.*

*19. A method of manufacturing a composite polymer electrolyte for a lithium secondary battery, the method comprising:*

*forming a first polymer matrix made of a first porous polymer with a first pore size;*

*synthesizing a lithium cationic single-ion conducting inorganic filler comprising an inorganic filler particle, wherein synthesizing the lithium cationic single-ion conducting inorganic filler comprises substituting a surface hydroxyl group (—OH) of the inorganic filler particle by at least one of an ionic hydrophilic group and a hydrophobic group;*

*dissolving a second porous polymer with a second pore size smaller than the first pore size and the lithium cationic single-ion conducting inorganic filler in a co-solvent to prepare a mixed solution;*

*coating the first polymer matrix with the mixed solution to form a second polymer matrix; and*

*impregnating the first polymer matrix and the second polymer matrix with an electrolyte solution.*

*20. The method of claim 19, wherein the synthesizing the lithium cationic single-ion conducting inorganic filler further comprises:*

*substituting the surface hydroxyl group (—OH) of the inorganic filler particle by a function group containing a sulfonic acid group (—$SO_3H$) or a carboxyl group (—COOH); and*

*substituting a proton ($H_{30}$) of the sulfonic acid group (—$SO_3H$) or carboxyl group (—COOH) by a lithium ion ($Li^+$).*

* * * * *